United States Patent
Ohlsson

(10) Patent No.: US 6,196,560 B1
(45) Date of Patent: Mar. 6, 2001

(54) COMBINED TROLLEY AND SEAT

(75) Inventor: Åke Ohlsson, Västerhaninge (SE)

(73) Assignee: Ohlssons Innovationsfabrik, Vasterhaninge (SE)

( * ) Notice: Subject to any disclaimer, the term of this patent is extended or adjusted under 35 U.S.C. 154(b) by 0 days.

(21) Appl. No.: 09/284,286

(22) PCT Filed: Oct. 10, 1997

(86) PCT No.: PCT/SE97/01697

§ 371 Date: Apr. 12, 1999

§ 102(e) Date: Apr. 12, 1999

(87) PCT Pub. No.: WO98/16416

PCT Pub. Date: Apr. 23, 1998

(30) Foreign Application Priority Data

Oct. 11, 1996 (SE) .................................................. 9603729

(51) Int. Cl.[7] .................................................... B62B 1/12

(52) U.S. Cl. ............................ 280/30; 182/20; 280/652; 280/47.18; 280/47.25; 280/47.29; 297/118; 297/130

(58) Field of Search .............................. 182/20; 297/118, 297/130; 280/30, 47.18, 47.19, 47.25, 47.27, 47.28, 47.29, 652

(56) References Cited

U.S. PATENT DOCUMENTS

| | | | |
|---|---|---|---|
| 4,136,888 | * 1/1979 | Bowie, Jr. et al. | 280/47.25 X |
| 4,846,486 | 7/1989 | Hobson . | |
| 5,374,073 | 12/1994 | Hung-Hsin . | |
| 5,505,471 | * 4/1996 | Cheng | 280/47.29 X |
| 5,507,508 | * 4/1996 | Liang | 280/47.25 X |
| 5,695,246 | * 12/1997 | Tsai | 280/47.25 X |
| 6,000,713 | * 12/1999 | Lin | 280/47.25 X |

FOREIGN PATENT DOCUMENTS

| | | |
|---|---|---|
| 42 27 361 | 3/1993 | (DE) . |
| 353498 | 2/1973 | (SE) . |

* cited by examiner

Primary Examiner—Michael Mar
(74) Attorney, Agent, or Firm—Young & Thompson

(57) ABSTRACT

The present invention relates to a combined luggage trolley and seat comprising a main frame and a supporting frame, which in the region for the first ends of the main frame and the supporting frame are rotatably connected with each other around a first shaft: a wheel arrangement situated in the region of the first shaft; a seat which is rotatably connected with the main frame around a second shaft parallel to the first shaft, for rotation of the seat between a folded-up position and a sitting position, wherein the seat in the folded-up position extends essentially in the same plane as the main frame; and a drawbar which, when the seat is in the folded-up position, extends in a plane substantially coplanar with the main frame.

10 Claims, 2 Drawing Sheets

COMBINED TROLLEY AND SEAT

BACKGROUND OF THE INVENTION

There is a need for a combined luggage trolley and seat, which on the one hand gives the user of the trolley the possibility to transport articles, such as goods or suitcases, and which on the other hand gives the user the possibility to rest in a sitting position on the trolley.

According to the publication DE A1 42 27 361 a trolley is known in the prior art which comprises a main frame and a supporting frame, which in the region of the first ends of the main frame and supporting frame are rotatably connected with each other around a first shaft. A wheel arrangement is situated in the region of the first shaft. A seat is rotatably connected with the main frame around a second shaft, for rotation of the seat between a folded-up position and a sitting position, wherein the seat in the folded-up position extends essentially in a plane coplanar with the main frame. A drawbar extends in a plane essentially coplanar with the main frame when the seat is in the folded-up position.

The publication SE B 353 498 concerns a shopping trolley which at the lower end of an elongated frame has wheels and on the front side of the frame a container for goods. On the rear side of the frame there is a U-shaped handle which is hingedly connected with the frame. The frame and the U-shaped handle together support a sheet which, when the U-shaped handle is folded out from the frame, forms a seat which is situated above the goods container.

The disadvantage of the trolley according to DE A1 42 27 361 is that in the sitting position one has one's back facing towards the luggage, which means that it is difficult to monitor the luggage. SE B 353 498 lacks a supporting frame, which makes it impossible to transport luggage in the shape of large suitcases and boxes.

OBJECTS AND ADVANTAGES OF THE PRESENT INVENTION

The object of the present invention is to provide a luggage trolley which gives a user of the trolley the possibility to rest on the trolley in a sitting position and at the same time have his attention directed towards luggage which is loaded on to the trolley.

Another object of the present invention is to provide a luggage trolley which in a folded-up state extends in essentially one plane.

A further object of the present invention is to provide a luggage trolley which in a folded-up state can be converted into a shopping trolley.

Yet another object of the present invention is to provide a luggage trolley which gives a stable support to luggage which is intended to be loaded on to the trolley.

This is achieved according to the invention through the drawbar being rotatably connected with the seat around a third shaft, which is parallel to and situated at a distance from the second shaft; and that the drawbar in the sitting position of the seat forms a support leg for the seat.

With the present invention a combined luggage trolley and seat is obtained, which in a simple way and in a short time can be converted from a seat to a trolley in a towing and loading position for the transport of luggage, which is advantageous when one is, for example, waiting for the bus at a bus stop. Through the combined luggage trolley and seat in the folded-up state extending in essentially one plane, it only takes up a small space. Because in the sitting position the user can see his luggage, the luggage is easy to monitor.

DESCRIPTION OF THE DRAWINGS

The invention will be described more closely with reference to the embodiments shown on the appended drawings, where.

DESCRIPTION OF THE INVENTION

Figure 1:
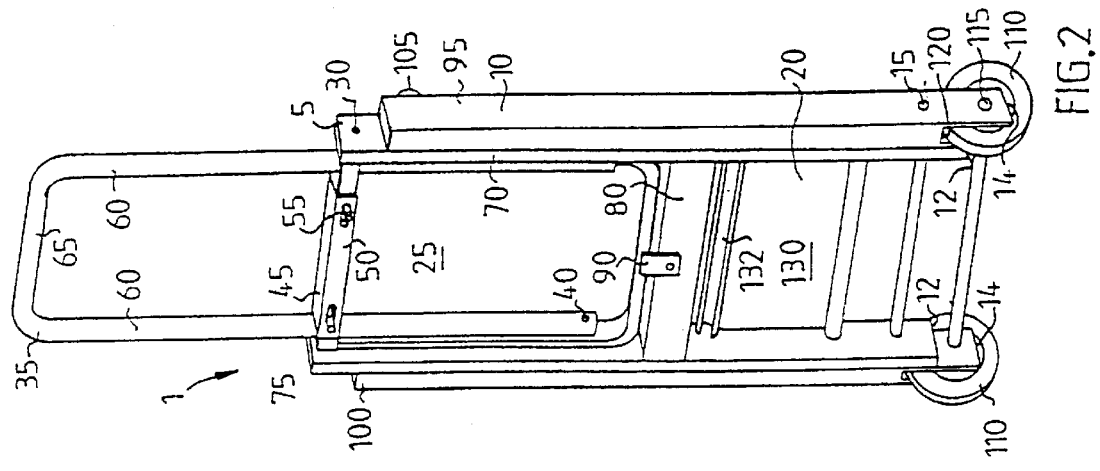
FIG. 1 shows a combined luggage trolley and seat according to the present invention in a towing and loading state.

FIG. 1 shows a combined luggage trolley and seat, called below trolley 1, according to the present invention in a towing and loading state. The trolley 1 comprises a main frame 5 and a supporting frame 10, which in the region of the first ends 12 resp. 14 of the main frame 5 resp. the supporting frame 10 are rotatably joined to each other around a first shaft 15. In the towing and loading state the angle between the main frame and the supporting frame is preferably 85° but the angle can lie in the interval 70°–90°. The main frame 5 and the supporting frame 10 are fixed in this state by means of a frame-locking means 20.

A seat 25 is rotatably connected with the main frame 5 around a second shaft 30 parallel to the first shaft 15 for rotation of the seat 25 between a folded-up position and a sitting position. In the folded-up position the seat 25 extends essentially in a plane coplanar with the main frame 5. In the folded-up position the seat 25 forms a support for luggage which is intended to rest on the supporting frame 10 and lean towards the main frame 5 and the seat 25. The sitting surface of the seat 25 is preferably provided with a coating which increases the sitting comfort.

A drawbar 35 is rotatably connected with the seat 25 around a third shaft 40, which is parallel to and situated at a distance from the second shaft 30. The drawbar 35 extends in the folded-up position of the seat 25 in a plane essentially coplanar with the main frame 5. The drawbar 35 and the seat 25 are lockable to each other by means of a drawbar lock 45, which is arranged on the seat 25. The drawbar lock 45 can comprise two resiliently pretensioned locking shoulders 50 which by means of an operating lever 55 arranged on each locking shoulder 50 are manoeuvrable to a locked resp. unlocked position between the seat 25 and the drawbar 35. The drawbar 35 is formed preferably by a U-shaped handle, which comprises two substantially parallel bars 60, which are connected by a crossbar 65 which also forms a hand grip.

The main frame 5 comprises a first and a second leg 70 resp. 75, which are essentially parallel with each other and mutually connected by means of an intermediate bar 80, which has a first supporting surface 85 for the seat 25 in the folded-up position of the seat 25. The intermediate bar 80 and the seat 25 in the folded-up state of the seat 25 are lockable to each other by means of a seat lock 90. The seat lock 90 can be formed of a rotatable hasp which is mounted in the intermediate bar 80.

The supporting frame 10 comprises a first and a second loadfork branches 95 resp. 100, which are substantially parallel with each other and mutually connected by means of a loadfork bar 105. The loadfork branches 95, 100 can be provided with a friction-increasing surface to prevent the luggage from sliding on them.

A wheel arrangement comprising two wheels 110 is rotatably supported by a fourth shaft 115 which is parallel to the first shaft 15. The fourth shaft 115 extends through the first and second loadfork branches 95 resp. 100 of the supporting frame 10. The wheels 110 are situated at the region of the first end 14 of the respective loadfork branches 95, 100 and are mounted by means of the fourth shaft 115. The loadfork branches 95, 100 are preferably wider than the wheel 110 so that the wheel 110 can be inserted into a cavity 120 which is formed in the first end 14 of the loadfork branch 95, 100. In this way a support is formed on each side of the wheel 110. The wheel 110 can also be arranged in other ways on the respective loadfork branches 95, 100.

The frame-locking means 20, which fixes the main frame 5 and the supporting frame 10 in relation to each other in the towing and loading state, is rotatably supported around a fifth shaft 125 which extends through the first and second legs 70 resp. 75 of the main frame 5. The frame-locking means 20 comprises a flap 130 which, during locking between the main frame 5 and the supporting frame 10, is intended to grip a tube-shaped casing 135 which surrounds the fourth shaft 115. According to the preferred embodiment the flap 130 comprises a groove 132, which grips the casing 135 around the fourth shaft 115 and fixes the casing 135 by a locking hook (not shown). Alternatively the groove can grip directly onto the fourth shaft 115. The flap 130 of the frame-locking means 20 is preferably so wide that it extends between the first and second legs 70 resp. 75 of the main frame 5. This means that the frame-locking means 20 can absorb considerable forces in several directions and can contribute to increasing the torsional stiffness of the trolley 1.

The bearing point of the first shaft 15 with the first and second loadfork branches 95 resp. 100, seen in the longitudinal direction of the respective loadfork branches 95, 100, is situated between the position for the bearing point of the fourth shaft 115 with the respective loadfork branches 95, 100 and the position for the fastening of the loadfork bar 105 with the respective loadfork branches 95, 100. The bearing point of the first shaft 15 with the first and second legs 70 resp. 75 of the main frame 5 is situated at a distance from the first end 12 of the first and second legs 70 resp. 75. This means that the trolley 1 will rest on a surface by means of the first ends 12 of the first and second legs 70 resp. 75 and the loadfork bar 105 when the trolley 1 is parked in the towing and loading state shown in FIG. 1. Consequently the wheels will be at a distance from the surface, which means that the trolley 1 will be stable during loading and unloading of luggage. The ends 12 of the first and second legs 70 resp. 75 resting on the surface, can be provided with pads (not shown) of a soft material in order to avoid damage in the surface.

Figure 2:
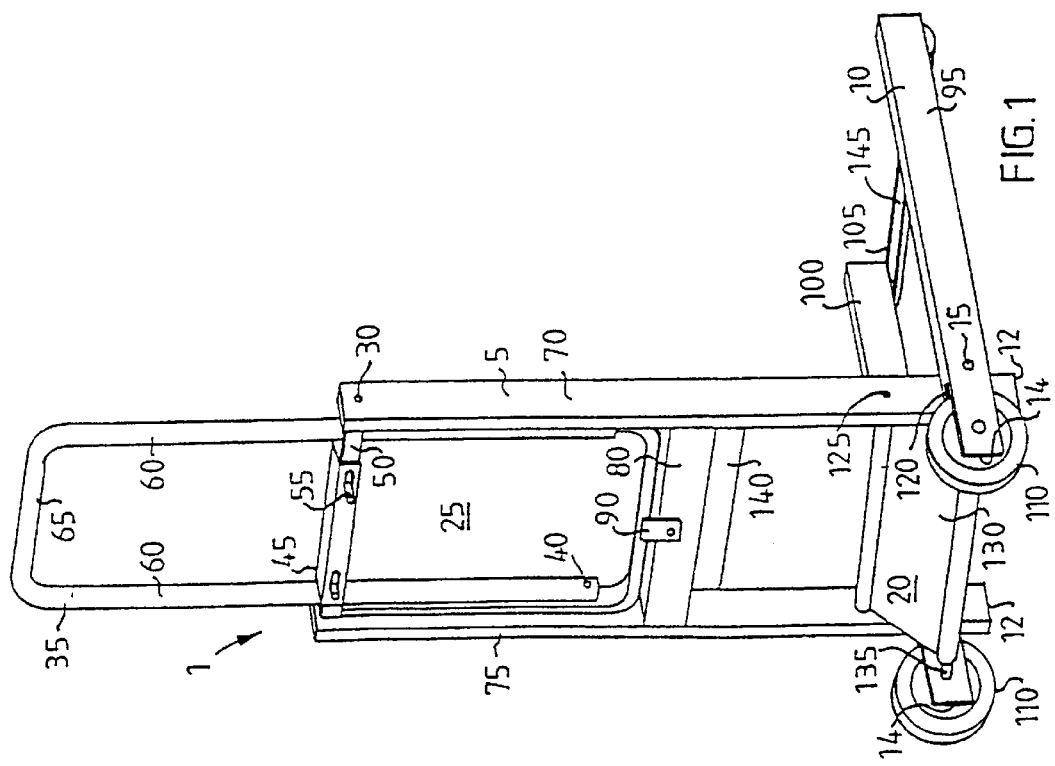
FIG. 2 shows a combined luggage trolley and seat according to the present invention in a folded-up state.

FIG. 2 shows the combined luggage trolley and seat one in a folded-up state. By releasing the frame-locking means 20 from the fourth shaft 115 the main frame 5 and the supporting frame 10 are allowed to swing freely relative to each other around the first shaft 15. Preferably the distance between the first and the second loadfork branches 95 resp. 100 is greater than the distance between the first and the second leg 70 resp. 75, which means that the main frame 5 and the supporting frame 10 will lie in the same plane when the supporting frame 10 is folded in towards the main frame 5. In the folded-up state the loadfork bar 105 is in contact with the first and second legs 70 resp. 75 of the main frame 5. The main frame 5 and the supporting frame 10 can in the folded-up state be locked to each other by means of a locking means (not shown). This locking means can, for example, be a resilient ball which is arranged in the main frame 5 and which ball is intended to grip into a depression in the supporting frame 10 in the locked position.

The frame locking means 20 can be provided with a spring-pretensioned device (not shown) which endeavours to swing the flap 130 of the frame-locking means 20 around the fifth shaft 125. In the folded-up state of the trolley 1 flap 130 of the frame-locking means 20 is in contact with a second support surface 140 of the intermediate bar 80 and is held in this position by means of the spring-pretensioned device. The spring-pretensioned can, for example, be a helical spring threaded around the fifth shaft 125.

Figure 3:
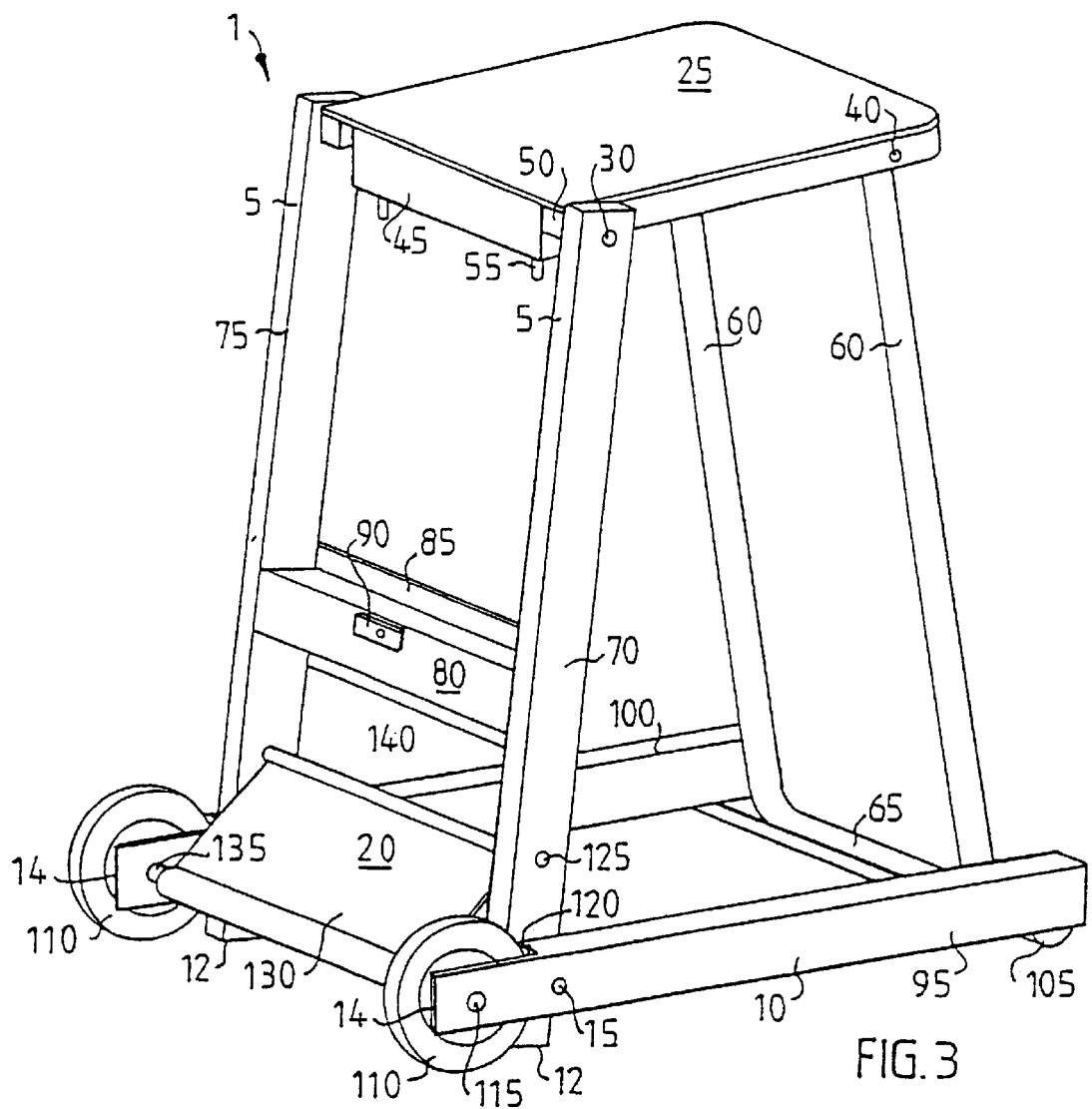
FIG. 3 shows a combined luggage trolley and seat according to the present invention in a sitting position.

FIG. 3 shows the combined luggage trolley and seat 1 in a sitting position. In order to convert the trolley 1 from the towing and loading position to the sitting position the seat lock 90 is unlocked, for example by rotation of the hasp, so that the seat 25 together with the drawbar 35 can swing freely around the second shaft 30. Thereafter, the drawbar lock 45 is unlocked, for example by the operating lever 55 being moved in a direction towards each other so that the locking shoulders come out of their grip with the drawbar 35. The drawbar 35 can now swing freely around the third shaft 40. By rotation of the seat 25 approximately three quarters (¾) of a rotation around the second shaft 30 from the folded-up position of the seat 25, the seat 25 will take up a horizontal position. Simultaneously with the swinging movement of the seat 25, the drawbar 35 is folded out from the seat 25 by letting the drawbar 35 rotate around the third shaft 40. The drawbar 35 in the sitting position is intended to have its crossbar 65 in contact against the loadfork bar 105. Consequently, the drawbar 35 forms a supporting leg for the seat 25 in the sitting position. The loadfork bar 105 is preferably provided with an indentation 145 which extends in the longitudinal direction of the loadfork bar 105. The crossbar 65 of the drawbar 35 is intended to rest in the indentation 145 of the loadfork bar 105, which permits a stable contact. Conversion from the sitting position to the towing and loading position is performed in the reverse order.

The drawbar 35 can be provided with a telescopic arrangement (not shown), which permits extension of the drawbar 35. The locking of the telescopic arrangement can be performed with the drawbar lock 45. An alternative telescopic arrangement can be that the drawbar 35 can be folded around a hinge (not shown) in a direction towards the seat 25.

In the folded-up position of the trolley 1 it is conceivable that a goods container (not shown) can be arranged on the main frame 5 so that a shopping trolley is formed. In this embodiment it is not meant that the trolley 1, with the goods container mounted, will be convertable into a seat.

The frame-locking means 20 is constructed so that it is able to absorb large forces which are directly opposite the forces which occur when a load is placed on to the supporting frame 10. This is so that the trolley 1 will not collaps when used as a seat.

The main frame 5 and the supporting frame 10 are suitably manufactured from aluminium profiles with rectangular cross-sections. The drawbar 35 is suitably manufactured from an aluminium profile with a circular cross-section. The seat 25 can be manufactured from aluminium, wood or plastic. Other materials are also conceivable for the constituent parts of the trolley 1.

What is claimed is:

1. Combined luggage trolley and seat (1) comprising a main frame (5) and a supporting frame (10), the main frame having ends (12,14) by which the main frame (5) and the supporting frame (10) are rotatably joined with each other around a first shaft;

a wheel arrangement connected to the trolley in the region of the first shaft (15);

a seat which is rotatably connected with the main frame around a second shaft (30) parallel with the first shaft (15) for rotation of the seat (25) between a folded-up position and a sitting position, wherein the seat (25) in the folded-up position extends essentially in a plane coplanar with the main frame (5); and a drawbar (35), which extends in a plane essentially coplanar with the main frame (5) when the seat (25) is in the folded-up position; the improvement wherein the drawbar (35) is U-shaped and has legs with free ends which are rotatably connected with the seat (25) around a third shaft (40), which is parallel with and situated at a distance from the second shaft (30); and the drawbar (35) forms a support leg for the seat (25) when the seat (25) is in the sitting position, the drawbar having an end remote from the seat (25) that is engagable with an end of the supporting frame (10) remote from the main frame (5) when the seat (25) is in said sitting position, the remote end functioning as a handle for the luggage trolley when the seat is in said folded-up position.

2. Combined luggage trolley and seat according to claim 1, wherein the seat (25) swings approximately three quarters of a rotation around the second shaft (30) from the folded-up position with the seat positioned against a first support surface (85) to the sitting position.

3. Combined luggage trolley and seat according to claim 1, wherein the main frame (5) comprises a first and a second leg (70 resp. 75), which are essentially parallel with each other and mutually connected by means of an intermediate bar (80), which is a first support surface (85) of the seat (25) in the folded-up position of the seat (25).

4. Combined luggage trolley and seat according to claim 3, wherein the intermediate bar (80) and the seat (25) are lockable to each other by means of a seat lock (90) in the folded-up position of the seat (25).

5. Combined luggage trolley and seat according to claim 1, wherein the handle and the seat (25) are lockable to each other by means of a drawbar lock (45), which is arranged on the seat (25) and comprises two resiliently pretensioned locking shoulders (50), which by means of respective operating levers (55) are maneuverable between a position of gripping with the handle and a free position.

6. Combined luggage trolley and seat according to claim 1, wherein the supporting frame (10) comprises a first and a second loadfork branch (95 resp. 100), which are substantially parallel with each other and mutually connected by means of a loadfork bar (105) in the region of the supporting frame (10) facing away from the first end (14).

7. Combined luggage trolley and seat according to claim 6, wherein the drawbar (35) is adapted to be in contact with the loadfork bar (105) at an end which faces away from the seat (25) in the sitting position of the seat (25).

8. Combined luggage trolley and seat according to claim 6, wherein the wheel arrangement comprises two wheels (110), which are rotatably supported by a fourth shaft (115) which is parallel with the first shaft (15) and that the fourth shaft (115) extends through the first and second loadfork branches (95 resp. 100) of the supporting frame (10).

9. Combined luggage trolley and seat according to claim 8, wherein the main frame (5) and the supporting frame (10) are lockable by means of a frame-locking means (20) at an angle in relation to each other which lies in the interval of 70° to 90°, wherein the frame-locking means (20) is rotatably supported around a fifth shaft (125) which extends through the main frame (5), and wherein a flap (130) arranged in the frame-locking means (20) is adapted to grip the fourth shaft (115) in the locking position between the main frame (5) and the supporting frame (10).

10. Combined luggage trolley and seat according to claim 3, wherein the trolley 91) in the sitting position is adapted to rest on a surface with the first ends (12) of the first and the second leg (70 resp. 75) and with a loadfork bar (105).

* * * * *